Nov. 4, 1969             D. ROSE             3,476,247

WATER CONDITIONER APPARATUS

Filed March 17, 1967             15 Sheets-Sheet 1

INVENTOR
DONALD ROSE

BY Beale and Jones
ATTORNEYS

Nov. 4, 1969     D. ROSE     3,476,247
WATER CONDITIONER APPARATUS
Filed March 17, 1967     15 Sheets-Sheet 3

INVENTOR
DONALD ROSE
BY Beale and Jones
ATTORNEYS

INVENTOR
DONALD ROSE
BY Beale and Jones
ATTORNEYS

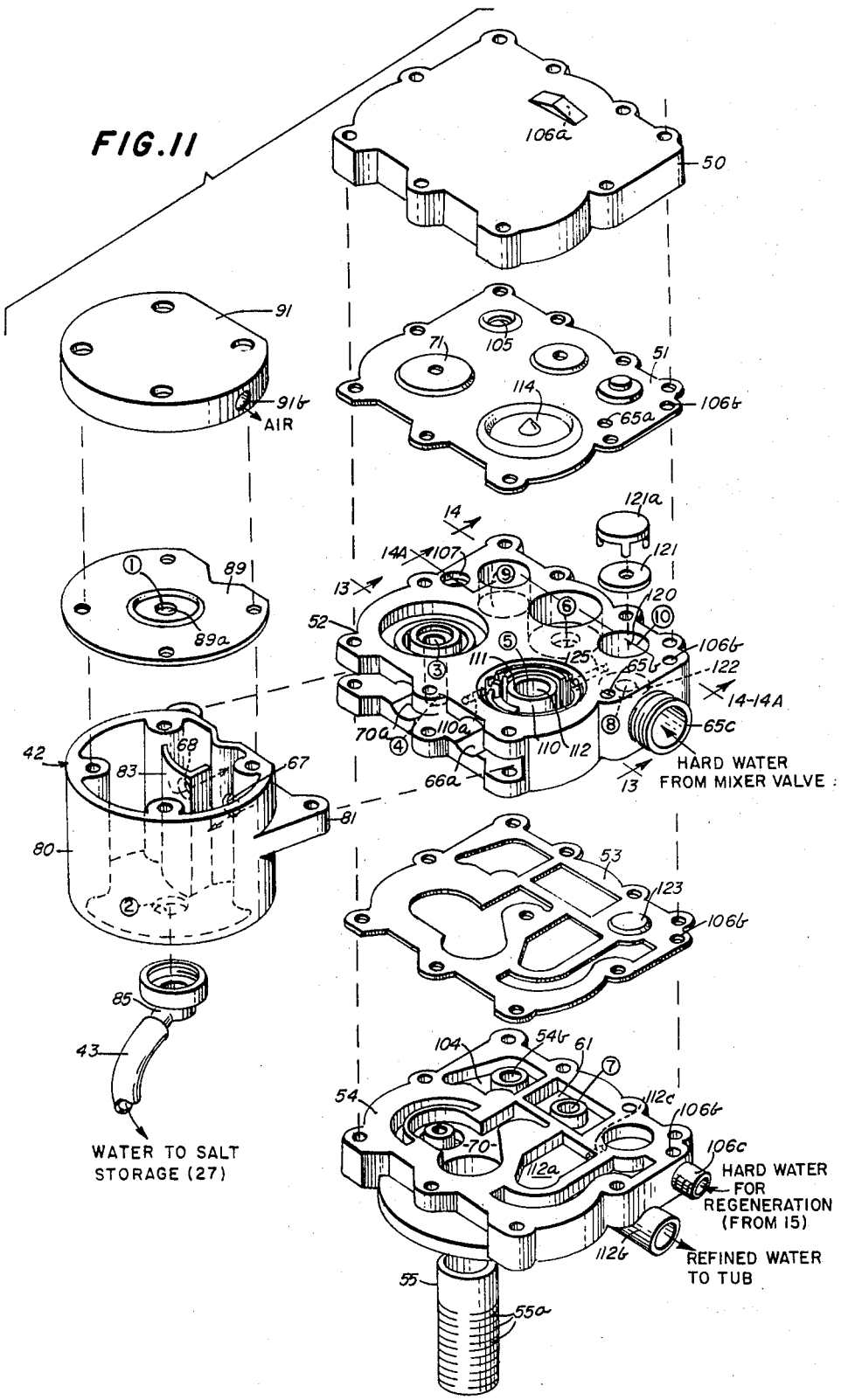

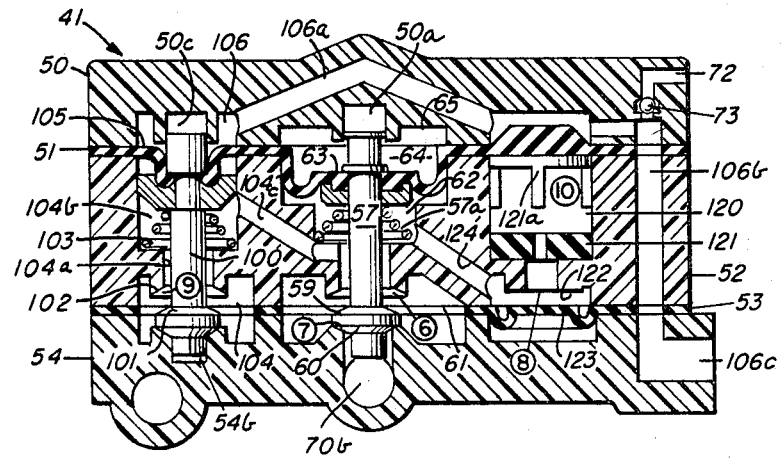

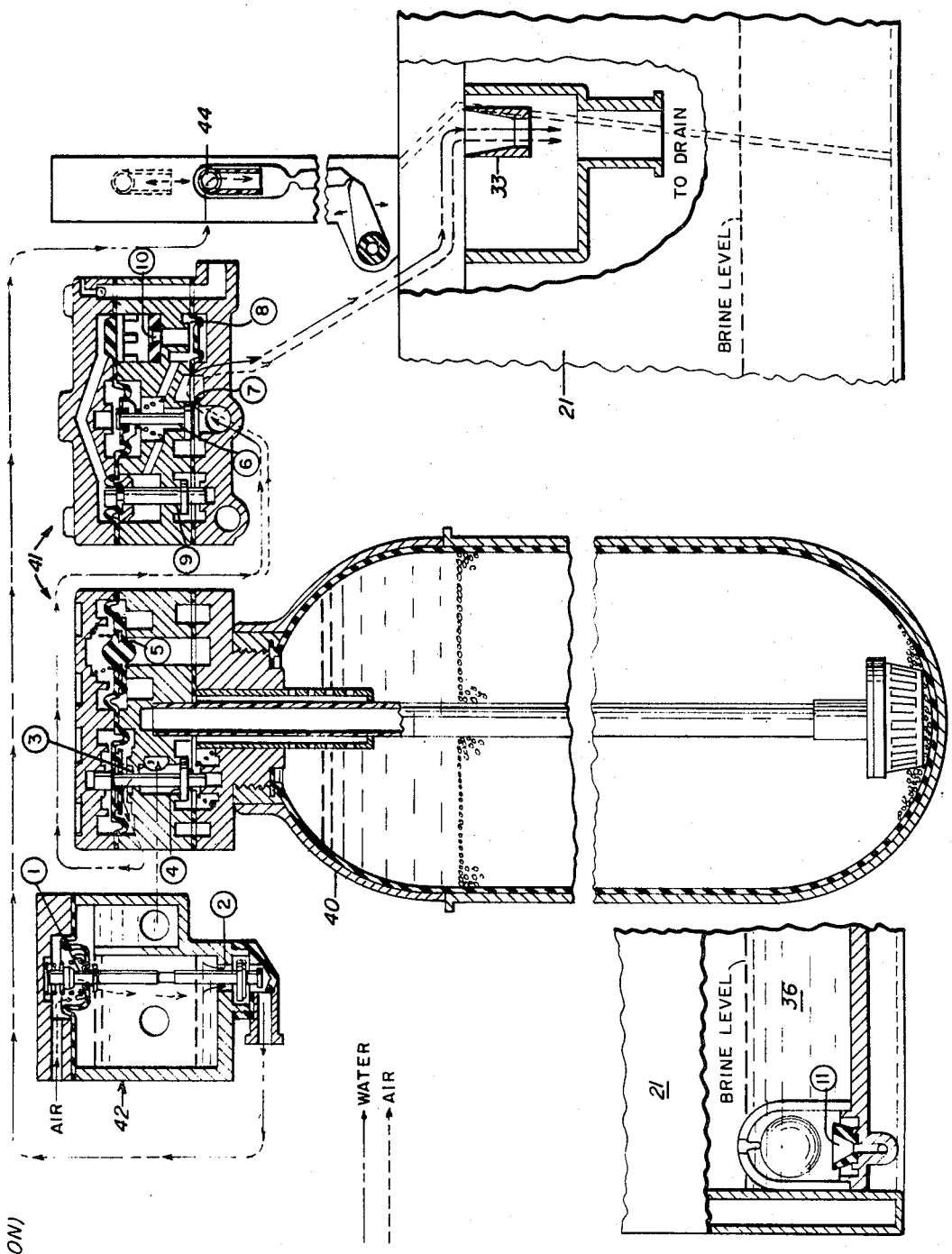

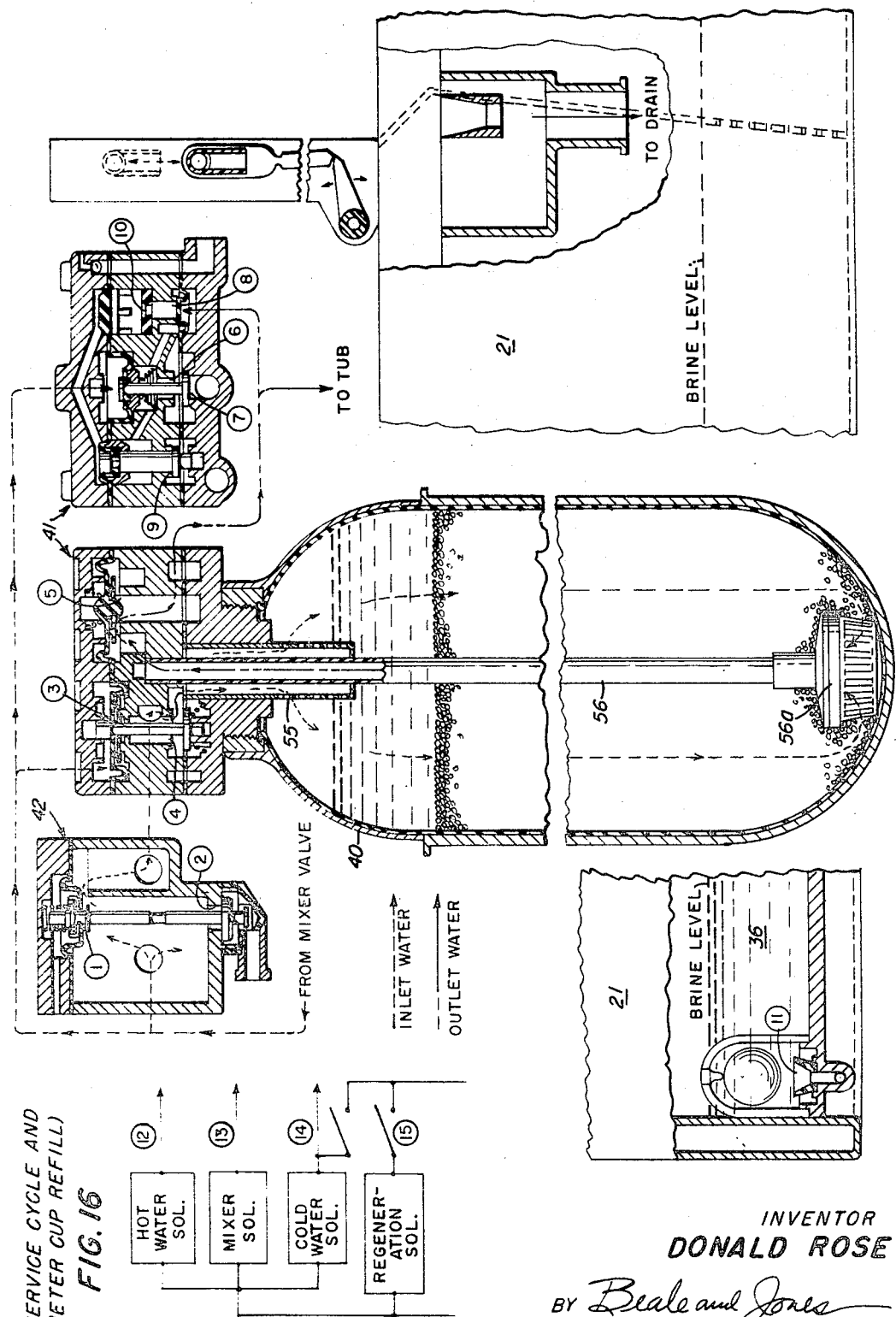

Nov. 4, 1969            D. ROSE            3,476,247
WATER CONDITIONER APPARATUS
Filed March 17, 1967            15 Sheets-Sheet 15
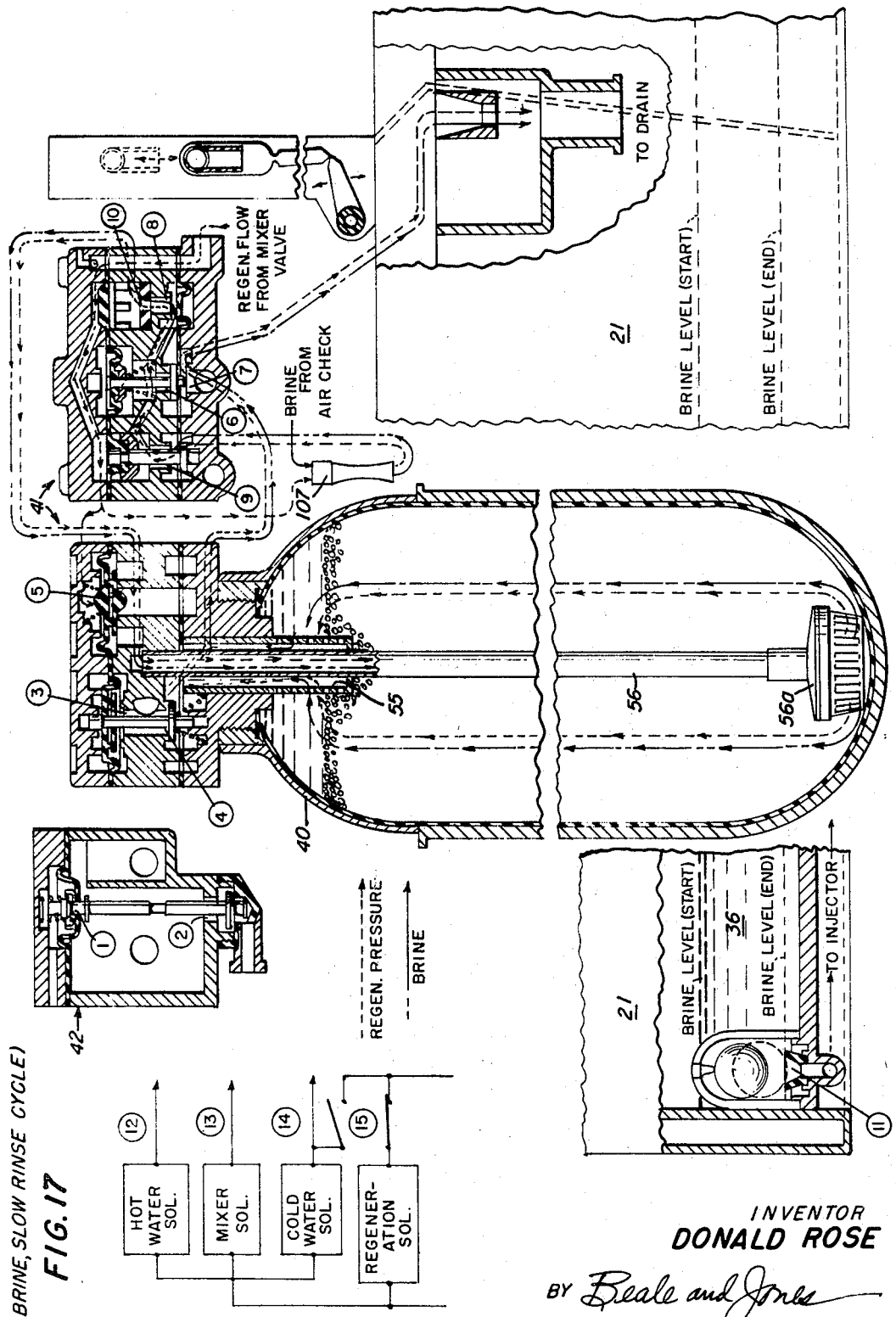
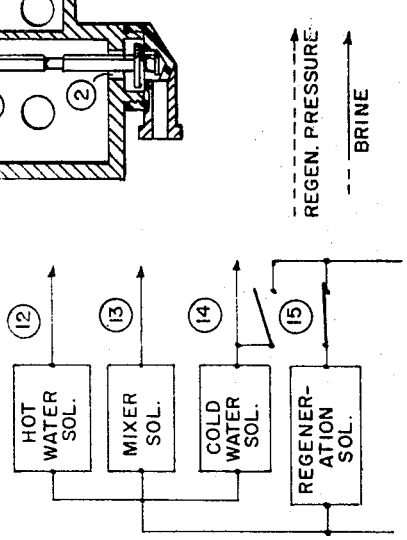
FIG. 17 (BRINE, SLOW RINSE CYCLE)
INVENTOR
DONALD ROSE
BY Beale and Jones
ATTORNEYS

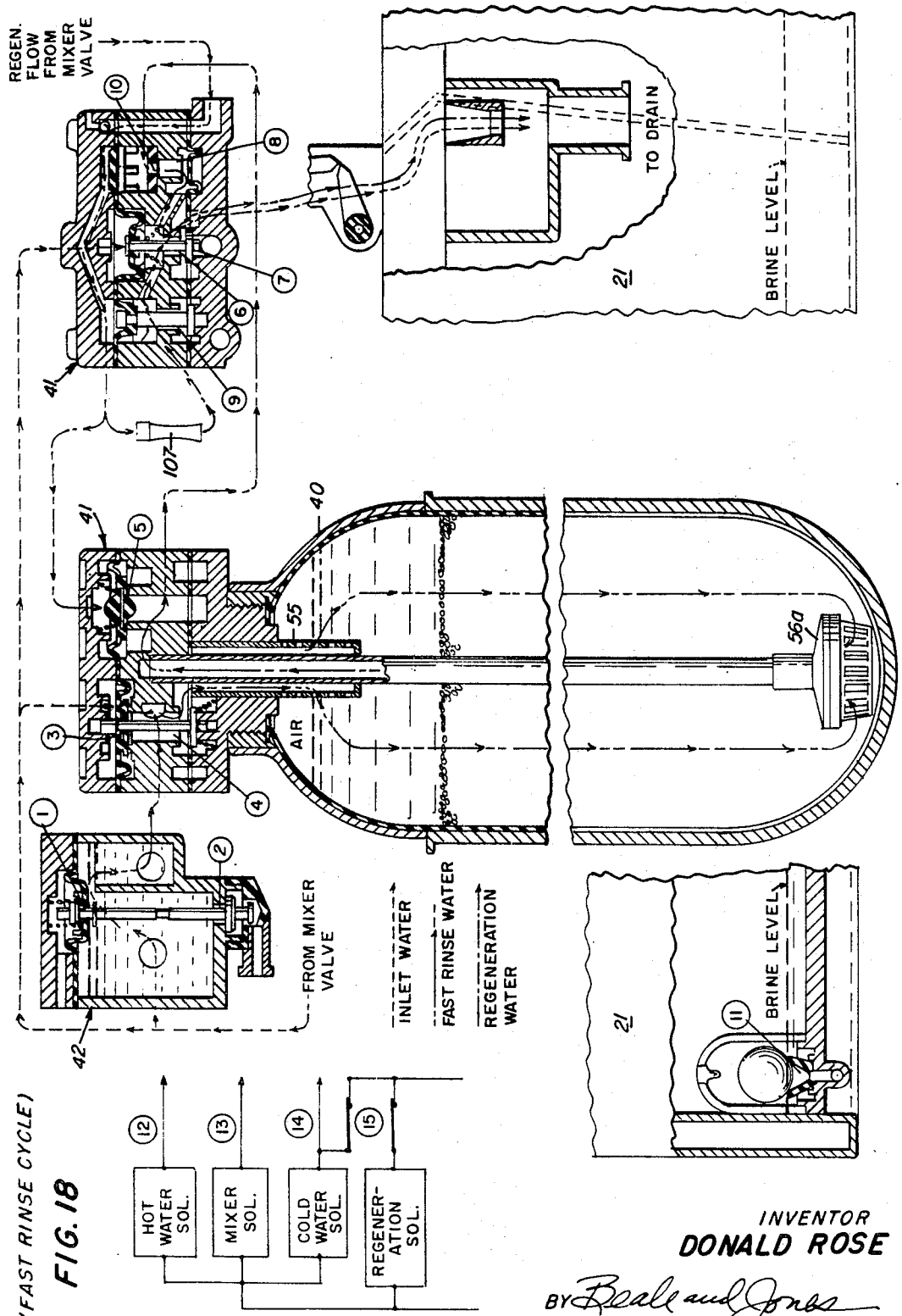

Nov. 4, 1969     D. ROSE     3,476,247
WATER CONDITIONER APPARATUS
Filed March 17, 1967     15 Sheets-Sheet 15
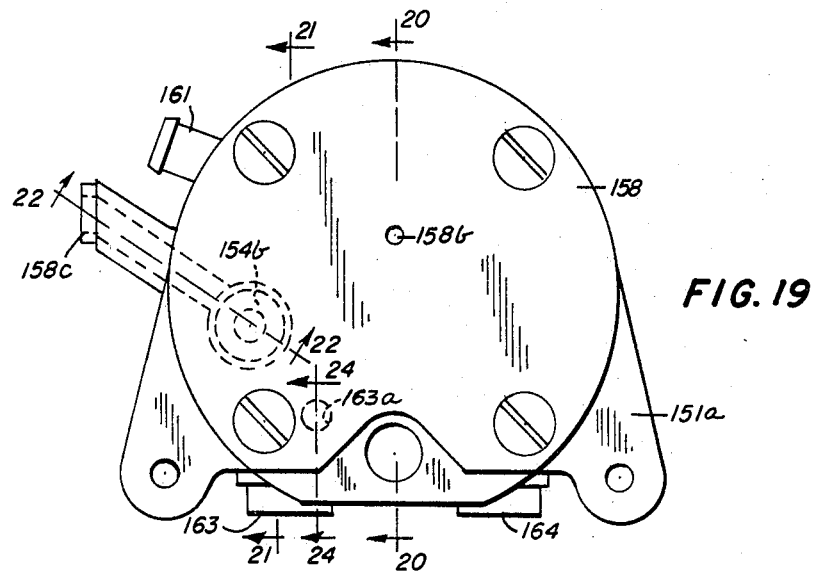
FIG. 19
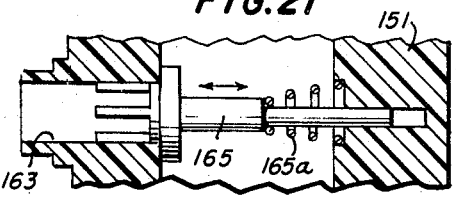
FIG. 21
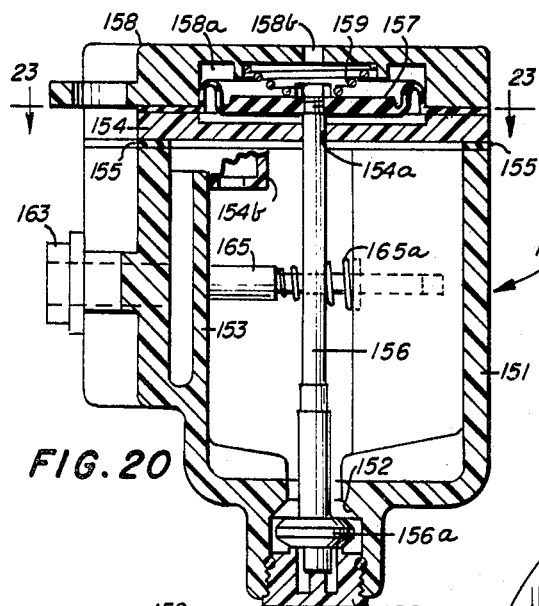
FIG. 20
FIG. 22
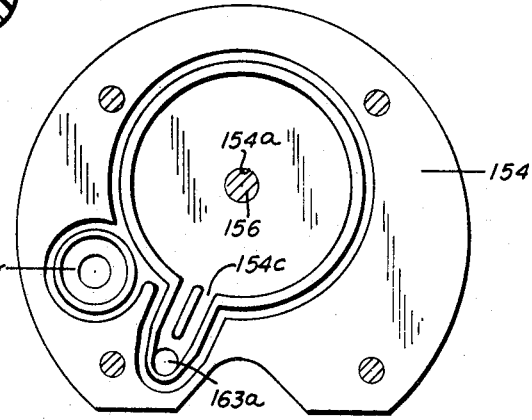
FIG. 23
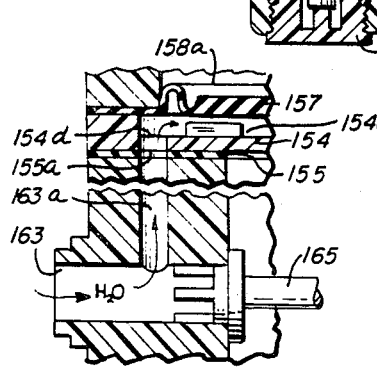
FIG. 24

United States Patent Office 3,476,247
Patented Nov. 4, 1969

3,476,247
WATER CONDITIONER APPARATUS
Donald Rose, Dayton, Ohio (% Water Refining Co.
Inc., 500 N. Verity Parkway, Middletown, Ohio
45042)
Continuation-in-part of application Ser. No. 314,130,
Oct. 7, 1963. This application Mar. 17, 1967, Ser.
No. 638,677
Int. Cl. B01d 35/02, 15/06, 15/04
U.S. Cl. 210—95                                    26 Claims

ABSTRACT OF THE DISCLOSURE

A compact water softener apparatus having a multiple valve head assembly therein which provides for water softening and softener regeneration, slow rinsing and fast rinsing, and which has a metering cup attached thereto with a height adjustable outlet which drains through a spillway into a brine reservoir adjacent the softener tank.

---

This is a continuation-in-part of application Ser. No. 314,130, filed Oct. 7, 1963, now U.S. Patent No. 3,342,336.

This invention is directed to improvements in water conditioner apparatus.

In certain instances where conditioned water is desired a full system of water conditioning may not be justified or desired. In these instances where the water is hard and needs further treating to remove turbidity and possible iron in solution, this improved water conditioner apparatus is devised to meet this need.

It is an object of the invention to provide a water conditioner where periodic relatively small amounts of conditioned water are desired.

A further object of this invention is to provide a water conditioner for use with washing machines and other periodically used separate apparatus where conditioned water is desired or required.

Another object of the invention is to provide a water conditioner that may be used in conjunction with such devices as washing machines or where intermittent use of conditioned water is desired and in which the mineral in the water conditioner is reconditioned during the washing of clothes or a batch of dishes or other periodic use of the conditioned water.

A still further object of this invention is to provide a water conditioner in conjunction with a periodically used device to which the conditioned water is supplied wherein during each sequence of use throughout the various cycles a metering chamber is utilized and at the end of each cycle empties its water or accumulated liquid into a brine and salt tank as make-up brine water or for other uses.

Yet a still further object of the invention is to obtain the benefit of a water conditioner and at the same time save on the amount of soap or detergent usually required in use of the washing machine.

A further object of the invention is to provide a water conditioner in conjunction with a washing machine or other periodically operated device that will handle highly turbid and iron bearing waters. A still further object of the invention is to provide in a water conditioner of the relatively small type for batch water reconditioning, a fast rinse cycle for reconditioning the mineral bed of the conditioner whereby the mineral bed is reset, cleared of any iron and turbidity in suspension accumulations in the bed and all regeneration material pockets remaining in the bed are removed to provide for immediate full reconditioned water on next use of the conditioner for furnishing conditioned water.

A still further object of the invention is to provide a water conditioner for a washing machine or the like having a programmed timer wherein the same timer may be adapted to be used for operating the water conditioner in such a machine.

Another object of the invention is to provide a water conditioner of the relatively small type for use with such apparatus as drinking fountains, coffee, and soft drink dispensers, washing machines and isolated separate use conditioned water supply requirements.

A still further object of the invention is to provide a metering system for fluid wherein fluid is passed through a chamber and on each interruption of the passing of fluid the chamber drains out its bottom to a conduit whose outlet is at a level to which the fluid is to be drained down to in the chamber.

For a more complete understanding of the nature and scope of the invention reference is had to the drawings in which:

FIG. 11 is an exploded perspective view of the multiple valve body in the head assembly;

FIG. 14 is a sectional view of the multiple valve body of the head assembly taken on line 14—14 of FIG. 11;

FIG. 14A is a modification of the apparatus in FIG. 14 and generally taken on line 14a—14a of FIG. 11;

FIG. 15 is a view of the housing shown fragmentary with the container and mineral tank with multiple valve head assembly accompanied by diagrammatic views of certain sections or parts in the static position;

FIG. 16 is a view similar to FIG. 15, but showing the service cycle and meter cup refill with flow and positioning of certain supply valves;

FIG. 17 is a view similar to FIG. 16 but showing the arrangement of brine, slow rinse cycle;

FIG. 18 is similar to FIG. 16 but showing the apparatus for the fast rinse cycle;

FIG. 19 is a plan view of a modified metering cup or chamber;

FIG. 20 is a sectional view on line 20—20 of FIG. 19 of the modified metering cup;

FIG. 21 is a sectional view along line 21—21 shown fragmentary of the inlet water of the cup in FIG. 19;

FIG. 22 is a fragmentary sectional view along line 22—22 of FIG. 19 showing the air vent valve in the upper portion of the metering cup;

FIG. 23 is a sectional view along line 23—23 of FIG. 20 showing the top of the pressure operator and the air vent valve housing;

FIG. 24 is an enlarged sectional view along line 24—24 showing the branch passage of supply liquid pressure supply to pressure operator in the top of the metering cup.

Throughout the description like reference numbers refer to similar parts.

Figure 1:
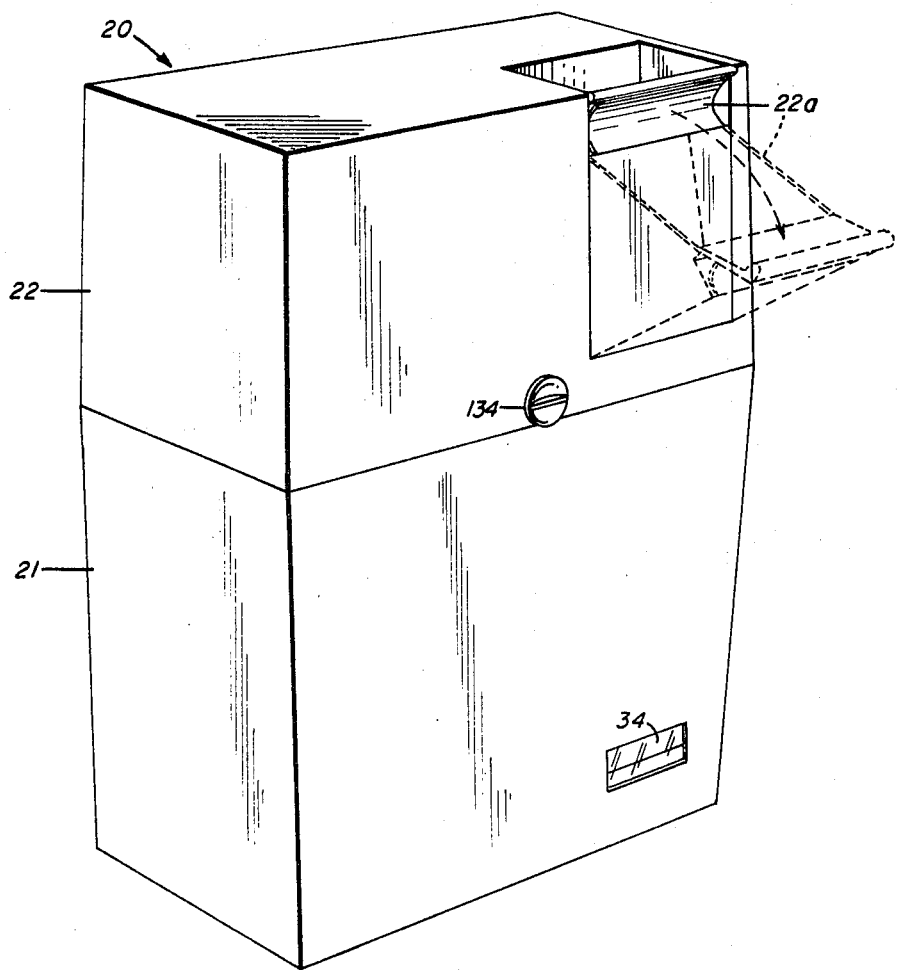
FIG. 1 is a perspective view of the front left of the water conditioner apparatus.
Figure 2:
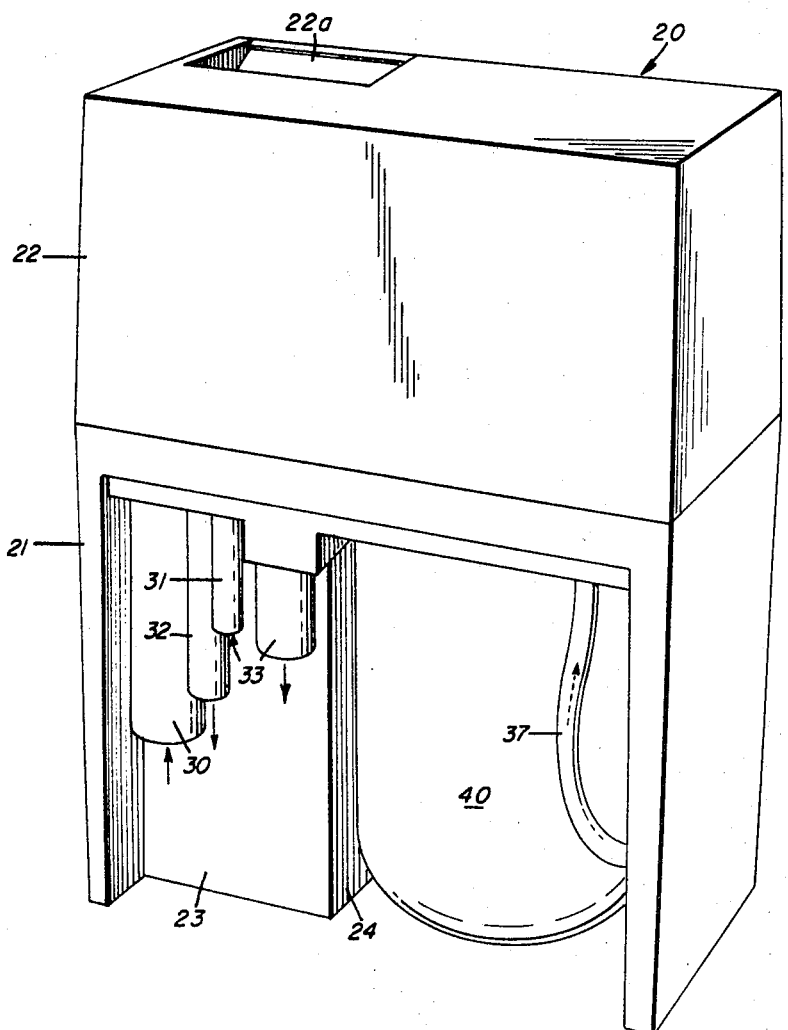
FIG. 2 is a perspective view of the rear of the apparatus.

Before describing the structure in detail the general concept of this apparatus is discussed for a better understanding of its make-up and operation. The particular application here illustrated is for a water conditioner to be used with a clothes washing machine of the automatic type which has the necessary hot and cold water supply with a mixer valve. There is added to this supply a regeneration solenoid and valve and all of this is controlled by the timer of the washing machine. The regeneration valve and solenoid can be built into the apparatus herein disclosed as well as arranged with the usual mixer valve, hot water valve and cold water valve of the clothes washing machine. So also the regular mixer valve, hot water valve, cold water valve and solenoid could be built into the multiple valve head assembly of this unit. So also just an inlet supply water valve and a regeneration supply water valve could be builit into the apparatus to make it an independent unit. The unit here illustrated is made so as to be supported by suitable brackets (not shown) above the automatic clothes washing machine. The housing is provided with a removable top and in the housing is a container portion for salt storage at one end, a brine portion extending from below the salt storage to the other end and an isolated well receiving the mineral tank which has the necessary assembly head carrying the multiple valve arrangement. In the housing are also built in guide passages, see FIG. 2.

There are tubular passageways in the back of the housing through which hoses are led. There is a hose passageway from the mixer valve to bring in the inlet water, a hose passageway from the regeneration valve to bring in the regeneration water, a hose passageway from the multiple valve unit conditioned water outlet to the tub and a hose passageway to the drain or set tub.

A feature of this invention is the brine make-up water metering cup or chamber which passes the supply of water therethrough followed by draining a measured amount to the salt storage and brine tank after interruption of each pulsing. There is a further control of the amount of brine make-up water fed into the brine tank at each interruption. A vacuum breaker to drain is built into the housing as well as a vacuum breaker on the regeneration water supply inlet.

In the particular unit, there is a "service" cycle wherein the supply water passing therethrough is conditioned; a "brine-slow rinse" cycle followed by the "fast rinse" cycle. In the particular illustration the service cycle is a flow down through the mineral bed, the brine-slow rinse is a flow up through the mineral bed while the fast rinse cycle is a flow down through the mineral bed with the effluent going up a stand pipe and to drain.

Without going into the details of construction, there will be given here as explanation of the liquid flow in the operation of the unit using the designation of certain openings which include solenoid valve openings or closings. These valve openings and solenoid valve openings are designated one through fifteen (1–15) in the various drawings particularly FIGS. 11 and 15–18.

A position of these various openings for the "static" position of the various valves and openings is shown in FIG. 15 and set forth in the table below.

STATIC POSITION

| | Position | Operating Force |
|---|---|---|
| Opening Number: | | |
| 1 | Open | Spring pressure. |
| 2 | do | Do. |
| 3 | do | Do. |
| 4 | Closed | Do. |
| 5 | do | Do. |
| 6 | do | Do. |
| 7 | Open | Do. |
| 8 | do | Gravity (normally open). |
| 9 | Closed | Spring pressure. |
| 10 | do | Gravity. |
| 11 | Open | Brine level. |

SERVICE CYCLE AND METER CUP REFILL

There are in the multiple valve head assembly many passages and valves. In one form of the composite valve there are three sections, a top, a middle and bottom as shown in FIG. 11. These sections have combination gasket and pressure operator diaphragm portions separating them. Suitable valve seats and passageways are formed in the sections some of which are made by cooperating abutting sections.

The various designated openings or circuits, are given below for the service cycle in table form.

| | Position | Operating Force |
|---|---|---|
| Opening Number: | | |
| 1 | Closed | Inlet pressure. |
| 2 | do | Do. |
| 3 | do | Do. |
| 4 | Open | Do. |
| 5 | do | Outlet pressure. |
| 6 | do | Inlet pressure. |
| 7 | Closed | Do. |
| 8 | do | Outlet pressure. |
| 9 | do | Spring pressure. |
| 10 | do | Gravity and flow. |
| 11 | Open | Brine level. |
| 12 | Open-Closed | Electricity. |
| 13 | do | Do. |
| 14 | do | Do. |
| 15 | Closed | Water pressure. |

Water from the mixer valve generally designated at 13 enters the middle section and it branches out into a first and a second branch after entering the middle section. The first branch goes up into the top section and across to pressurize the gasket diaphragm having a valve stem going down through the middle section to a valve which is in the drain cavity and closes an opening 7 in the drain cavity, thus preventing a flow from below up into the drain cavity. This stem passes through a transfer chamber above the drain cavity and has a top valve section opposite the lower valve closing off the transfer chamber at opening 6 when in up position. There is a branch from the top of the drain pressurizing diaphragm of this inlet water that goes to the top of the a diaphragm to close opening 3 therebelow which seals around a stem depending from the diaphragm. There is a passage under the diaphragm that has a bleed off to prevent it from pressurizing. The stem passing through opening 3 leads down through the middle section to the passage on to the bottom section. On the bottom of the valve stem is a valve that closes opening 4 in the lower face of the middle section. This last mentioned stem has a space around same as it goes through the lower part of the middle section. This space around the stem leads to a passage in the middle section that connects to the left hand outlet, see FIG. 11, of the measuring cup or chamber. This passage in the middle section is above and communicates with a passage in the bottom section leading to the top of the mineral tank through the opening around a stand pipe.

The other branch of the inlet water from the mixing valve goes into the middle section and with a corresponding matching channel in the bottom section conducts this second branch of mixer or inlet water to an outlet in the middle section to the right hand connection of the mixing cup to supply the cup, see FIG. 11.

In action, the water flows up in the cup and pressurizes its top diaphragm and closes vent opening 1 to atmosphere. A valve stem from the cup diaphragm extends to the bottom valve of the cup and it closes drain opening 2 of the cup on pressurization of the cup. This opening 2 leads to a botom drain conduit and supplies the brine make-up water.

The water goes from the left hand opening in the cup, see FIG. 11, to the top of the mineral tank, down through the mineral bed, up the stand pipe, to the middle section, through opening 5, where the pressure pushes up the diaphragm valve there, and the conditioned water goes down the center opening to a combined cavity in the middle and bottom section and on to the tub.

In the passage leading to the tub there is a restrictor, in one form of the apparatus, to provide back pressure. There is a lead off from the tub passageway last mentioned to pressurize a botom diaphragm portion in a lower gasket, in one form of the apparatus. This diaphragm pushes up against and closes an opening 8. As a comment here, the opening 8 permits water to come from an annular space adjacent opening 5 leading to the top of the stand pipe to opening 10 which is a transfer well and when 8 is open to the above referred to transfer chamber above the drain cavity, permitting the transfer chamber to drain for fast rinse.

Thus, in summary, as to service cycle and meter cup refill, the inlet water from mixer valve pressurizes a drain diaphragm valve to close opening 7, closes opening 3 and opens opening 4. The other branch of the inlet water from mixer valve passes through the metering cup or chamber and pressurizes same to close opening 1 and opening 2 and from the cup it passes through opening 4 on to the mineral tank about the stand pipe. It passes down through the mineral bed and up through the stand pipe leading from the bottom and through the opening 5 on to the tub at the same time pressurizes the valve to close opening 8.

BRINE-SLOW RINSE CYCLE

The brine-slow rinse cycle will now be described. Set forth below is a table with the position of the openings used for the general explanation given before describing the detailed construction so that a better understanding of the construction and operation of the multiple valve head assembly in this water conditioner will be understood.

| Position | | Operating Force |
|---|---|---|
| Opening Number: | | |
| 1 | Open | Spring. |
| 2 | do | Do. |
| 3 | do | Do. |
| 4 | Closed | Do. |
| 5 | do | Regen. pressure. |
| 6 | do | Spring and brine flow. |
| 7 | Open | Spring. |
| 8 | do | Brine injector and normally open. |
| 9 | do | Regen. pressure. |
| 10 | do | Brine injector and brine flow. |
| 11 | Open-Closed | Brine level and injector vacuum. |
| 12 | Closed | Water pressure. |
| 13 | do | Do. |
| 14 | do | Do. |
| 15 | Open | Electricity. |

The slow rinse cycle portion of the brine-slow rinse cycle which follows the brining is the same as for the valve settings and flow for brining except that no brine is drawn from the brine tank and the air check at opening 1 is closed, see FIG. 17.

The flow is from the regeneration valve, opening 15, which flow comes in the bottom section of the multiple valve assembly, up through an opening to the top section. There is a vacuum breaker in the top section where the incoming regeneration water flows to the top section, see FIG. 17. The water goes across the top section, and on over and by-passes the diaphragm for the drain valve.

It goes on through the top section to the top of the diaphragm which is connected to a rod having a valve in the bottom section controlling opening 9. This opening 9 connects with a mating passageway in the bottom of the middle section and the bottom section. The water also goes from the top of the diaphragm over the area for operating opening 9 on to the top of the jet passage in the top section. The jet is in the middle section and discharges into the passageway controlled by the valve at opening 9. In the middle section there is a brine suction intake that leads to the passage about the jet or venturi so as to draw brine from the brine tank. When the brine is drawn down to a certain point opening 11 closes to shut off the drawing of any air. The regeneration water at the area where it comes into the top section also has a passage leading to above a diaphragm portion of the top gasket to pressurize the same to close off opening 5. This prevents any communication from the annular passage at opening 5 area to the tub.

The brine and rinse water pass about the stem of the valve for opening 9 and up into the middle section. A passage in the middle section from about opening 9 leads to the transfer passage above the drain valve. This opening 6 at the bottom of the transfer passage is closed. The brine and slow rinse carrier water passes through this transfer passage to and through opening 8 on up into the transfer well opening 10. The pressure pushes the diaphragm at opening 8 down in the form being described. The brine and carrier water passes through opening 8 up through opening 10 and from there by a passage within the middle section up to the annular passage about opening 5. From here the brine and water passes on to the top of the stand pipe and down to the bottom of the mineral bed. It comes up through the mineral bed to the top and passes about the stand pipe to the passageway in the vicinity of opening 4 which is now closed, see FIG. 17. This passage adjacent opening 4 in the bottom member has a passage leading to below the drain cavity up through opening 7 through the drain cavity and on to the drain. The outside drain line from the multiple valve assembly is connected with the drain cavity and leads to the opposite side of the head assembly from where the inlet water comes from mixer valve, the regeneration water enters and the conditioned water leaves the tub.

When the brine is removed from the brine tank to the point where the opening 11 closes, the slow rinse water flow continues through the same passages, up through the mineral bed and on to the drain. The slow rinse flow rate is controlled by the size of the suction jet. It will be noticed that the drain is led by a connectable conduit from the valve head assembly to a vacuum breaker as shown in FIG. 17. The regeneration water for the slow rinse phase continues to flow while the regeneration takes place under the control, for example, of a timer.

FAST RINSE CYCLE

The fast rinse cycle is described in outline by reference to the various openings as a general description of the make-up of the apparatus. This is for a clearer understanding of the operation of the apparatus. The various designated openings or circuits are given below for the fast rinse cycle in table form.

| Position | | Operating Force |
|---|---|---|
| Opening Number: | | |
| 1 | Closed | Inlet pressure. |
| 2 | do | Do. |
| 3 | do | Do. |
| 4 | Open | Do. |
| 5 | Closed | Regen. pressure. |
| 6 | Open | Inlet pressure. |
| 7 | Closed | Do. |
| 8 | Open | Fast rinse flow. |
| 9 | do | Regen. pressure. |
| 10 | Closed | Fast rinse flow. |
| 11 | do | Brine level and injector vacuum. |
| 12 | do | Water pressure. |
| 13 | do | Do. |
| 14 | Open | Electricity. |
| 15 | do | Do. |

References to FIGS. 11 and 18 for the general explanation of the fast rinse cycle will be used.

The fast rinse cycle follows the brine-slow rinse cycle in time sequence. The regeneration solenoid has maintained the regeneration valve open and the regeneration water continues to flow as the slow rinse phase as described above for the brine-slow rinse cycle. The timer opens up the cold water opening 14 for this fast rinse cycle. Use is made of the cold water rather than the mixed hot and cold water, but it comes from the mixer valve opening. The regeneration water continues to pressurize the two areas, one a piston, one a diaphragm and to feed the suction jets as in the brine cycle for the slow rinse, but no brine is now passing through the system.

The inlet water comes into the body from the mixer valve arrangement as cold water. There are two branches for this inlet water as previously described for the service cycle. The first branch, as before described, passes through the top section to the top of the diaphragm about the drain valve and closes opening 7 and opens opening 6. The opening at 6 provides a passage to the drain passage from the transfer passage thereabove. The first branch of the inlet water continues from the top of the diaphragm operating the drain valve through the top section to above the top diaphrgam above the area of opening 3 so as to seal at opening 3 the opening about the rod connected with the diaphragm, as described before. The valve at the bottom of opening 3 opens opening 4 as before to the passage about the rod at opening 4. The second branch of the inlet water from the mixing valve assembly passes to the right hand opening of the meter, see FIG. 11. It passes through the cup and from the cup out its left hand opening, see FIG. 11, to the opening about the rod at opening 4 and hence down to the passage at opening 4.

The water from the passage about opening 4 goes to the top of the mineral tank and on down through the mineral bed and up through the stand pipe as a fast rinse. It removes any residual brine that may have not been removed by the slow rinse cycle. It resets the mineral bed and removes any turbidity pockets. The fast rinse water passes from the bottom up through the stand pipe to the annular space about opening 5. The opening 5 is closed and the fast rinse water now moves from the annular passage about opening 5 to the connecting passage in the middle section, see FIG. 11, to the transfer well 10. It then passes down through the transfer well through opening 8 where it pushes the valve off of its seat in the particular form here described, through transfer passage, see FIG. 18, to the transfer chamber above the drain. It passes from the transfer chamber above the drain through opening 6 to the drain cavity and on out of the valve head to the drain. The regeneration water from the venturi jet passes through the opening 9 on into the transfer passage above the drain, but from the opposite direction, see FIG. 18, and thence through opening 6 on to drain along with the fast rinse water.

When the regeneration water is interrupted, the vacuum breaker at the top of the top section in the regeneration line opens and allows air to come back into the regeneration line, should there be a suction on the hard water supplied by the regeneration valve.

The pressure on the meter cup goes off as the inlet water from the mixer valve is interrupted. The air vent 1 opens at the top of the meter cup and the meter cup drains through opening 2 a measured amount to the brine make-up water in the brine tank as will be described more fully.

Figure 3:
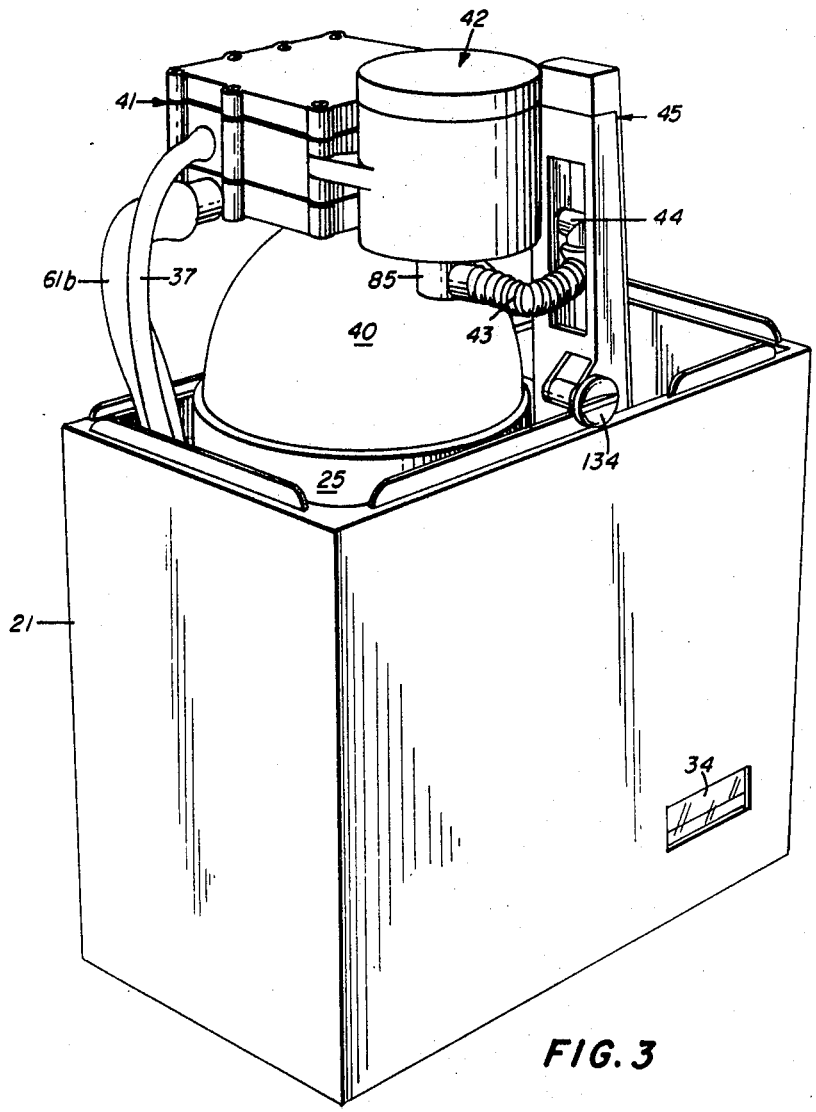
FIG. 3 is a perspective view of the apparatus with cabinet top removed as viewed from the left.
Figure 4:
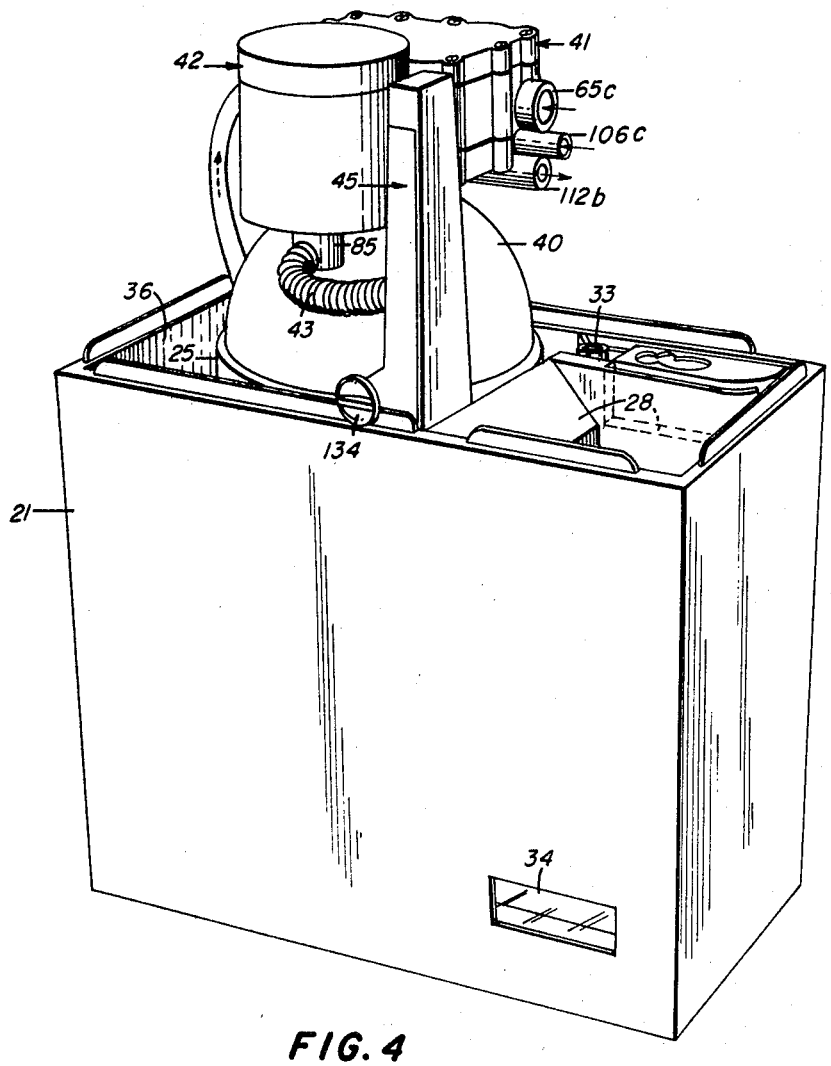
FIG. 4 is a perspective view of the apparatus with top removed as viewed from the right.
Figure 5:
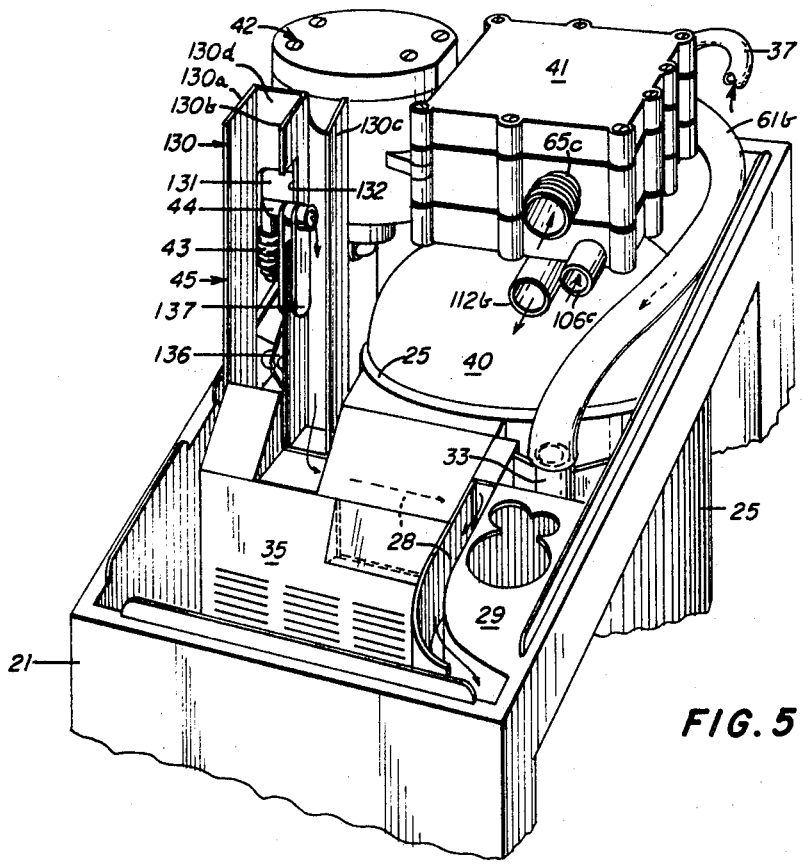
FIG. 5 is a persepctive view of the apparatus with cabinet top removed as viewed from the right rear.

The water conditioner is generally indicated at 20 and has a housing 21 having a housing top 22. The housing top has a salt filling access pull-out closure and chute 22a in the front face thereof. The housing has a back wall 23, a center wall 24, see FIG. 2, and an arcuate wall 25, see FIG. 3, thus forming a container 26 within the housing, see FIG. 6. In the container 26 at one end is a salt storage portion 27, a removable molded assembly having a spillway or channelway 28 for brine make-up water transferred to the brine tank. There is a horizontal floor 29, see FIG. 6, having tubular vertically extending passages for hoses. These passages are designated 30 for the inlet water hose, 31 for the regeneration water hose, 32 for the hose leading to the tub of the washing machine and 33 for the drain hose. In the front of the housing is a sight glass 34 towards the bottom thereof to indicate the presense or absense of salt. A removable perforated partition 35 is provided adjacent the salt storage area 27 having horizontal slots therein to permit free flow of brine water to the brine tank portion 36 of the container, see FIG. 7. A brine suction hose 37 leads from a molded fitting 37a in the bottom of the container which houses a ball check valve 37b. This serves as an air check in the brine suction line when the brine has drawn down to a certain level.

There is a mineral tank 40 having a mineral bed therein for conditioning the water. This tank has a multiple valve head assembly 41 detachably attached to the top thereof, see FIG. 13. The multiple valve head assembly has a brine make-up metering cup or chamber 42 which has leading therefrom a drain conduit 43 having a discharge elbow 44, see FIG. 3, which is supported by an adjustable support generally indicated at 45 for positioning the level of the outlet elbow 44. This positioning of the elbow 44 determines the level to which the metering cup is drained and thus in part the amount of brine make-up water emitted to the brine tank. The elbow 44 discharges into the spillway 28.

The mineral tank 40 is secured within the housing adjacent the container portion 26 and within the arcuate wall portion of the housing.

MULTIPLE VALVE HEAD ASSEMBLY

The multiple valve head assembly 41 will now be described with main reference being given to FIGS. 11–14A. The head assembly is made up of a valve body having three sections, a top section 50, a top combined gasket and pressure operator 51, a middle section 52, a bottom combined gasket and pressure operator 53, and a bottom section 54. Suitable through bolts hold the sections and combined gasket and pressure operators together. There are guide ways for valve stems and passageways for fluid transfer in the valve body 41 formed by matching passageways in the faces of the cooperating sections and within the sections themselves. Attached to the valve body is a top distributor tube 55 for the mineral tank 40. This distributor tube 55 has spaced apart slots 55a therein, see FIG. 13, to insure a proper distribution of the incoming water above the mineral bed so as to prevent channeling within the mineral bed. A stand pipe 56 extends from the bottom of the mineral bed where it has a distributor 56a upward through the mineral bed into the valve body central portion where it connects with certain passages to be described.

Figure 6:
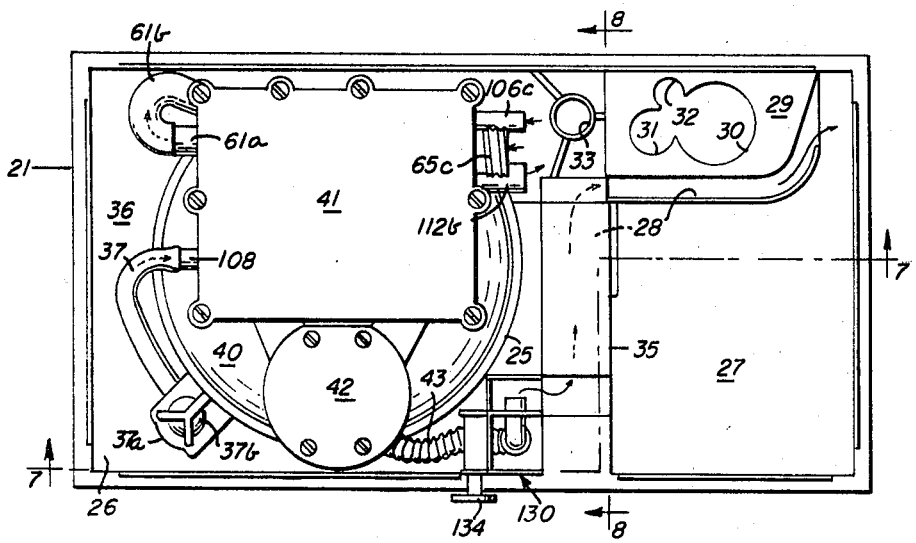
FIG. 6 is a plan view with cabinet top removed.
Figure 7:
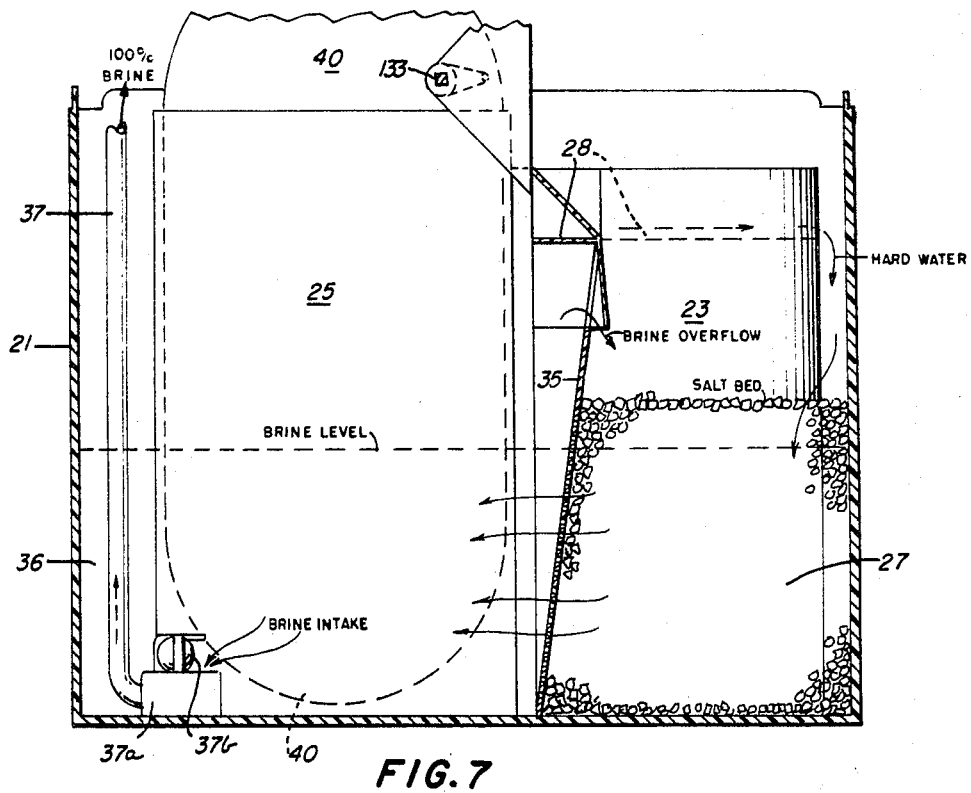
FIG. 7 is a sectional view taken along line 7—7 of FIG. 6.

Referring specifically to FIG. 14 a drain valve stem 57 for a drain valve is provided with a pressure spring 57a to hold it in up position as shown in FIG. 14A. Associated with this drain valve stem 57 is an upper valve portion 59 and a bottom valve portion 60. The portion 59 on the stem seats on an adjacent seat in section 52 and closes and opens the opening 6 while the portion 60 of the valve seats on an adjacent seat in section 54 closes and opens opening 7. A drain passage 61 is formed by a cavity within the bottom of the middle section 52 and the top of the bottom section 54 and this leads to an external drain fitting 61a as shown in FIG. 6. A transfer passage 62 is formed in the middle section 52 above the drain passage 61 and communicates through opening 6 about the valve stem 57 with the drain passage 61 when the valve portion 59 is off of its seat. There is a drain valve pressure operator diaphragm portion 63 formed in the combined gasket and pressure operator 51 and this operates within a drain valve pressure operator chamber 64 formed within the bottom face of the top section 51 and the top face of the middle section 52. A guideway 50a is formed in top section 50 to guide the valve stem 57. There is a passageway 65 in the top section communicating with the pressure operator chamber 64 that leads through the top section 50 to a vertical aperture 65a extending through the gasket 51, see FIG. 11, down through the vertical passage 65b in the middle section 52 where it leads to the outside inlet from mixer valve 65c. This passage 65 also has a branch 65d, see FIG. 13, leading to the top of pressure operator 71 for valve stem 69 to be described. The above described passageway 65 forms the first branch of the inlet water from the mixer valve opening, generally designated 15 in the previous description.

There is a second branch of the incoming inlet water that passes through channel 66 in the bottom and top sections from the inlet 65c, see FIG. 11, and this connects with an outlet 66a in the middle section 52. The outlet 66a connects with meter cup inlet 67 which has an outlet 66 connecting with the middle section 52 at 70a.

Figure 13:
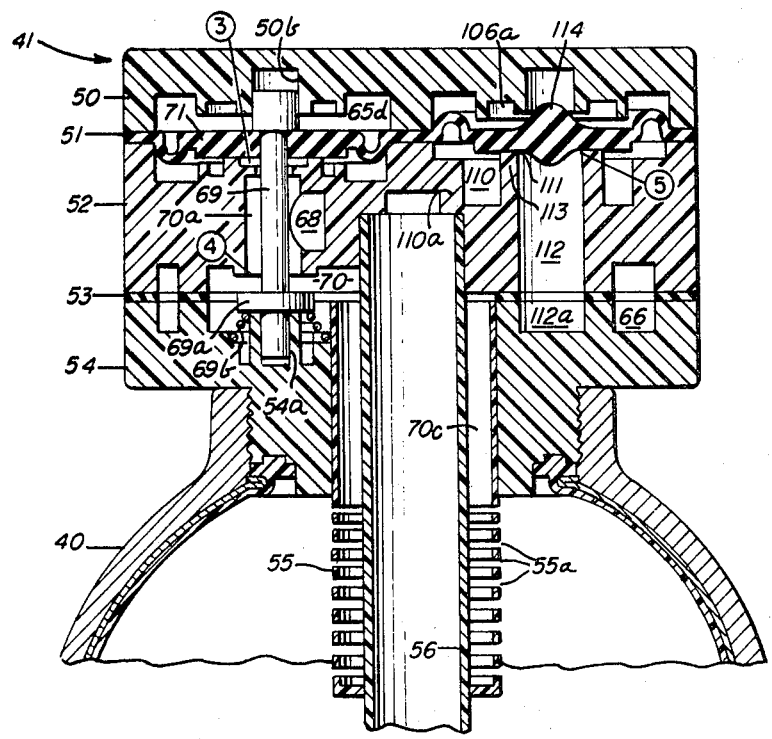
FIG. 13 is a sectional view of the multiple valve body assembly on an enlarged scale taken on line 13—13 of FIG. 11.

In FIG. 13, there is shown a valve stem 69 for the mineral tank communication valve which controls opening 4. The stem 69 has a valve portion 69a on the bottom thereof that closes with a seat on the bottom of the middle section 52 at opening 4 about the valve stem 69. A suitable spring 69b urges the valve upwardly and closes it. A mineral tank communication passage 70 is formed in the bottom face of the middle section and the top face of the bottom section and it has a passage 70a in section 52 about the valve stem 69 leading to the outlet 68 of the metering cup. Another passage 70b in the lower section 54, see FIG. 14, feeds to below the drain passage 61, previously described. A further passage 70c leads from passage 70 through the distributor 55 to the top of the mineral tank.

A pressure operator 71 is a part of the combined gasket pressure operator member 51 and is attached to the top portion of the valve stem 69. It receives its pressure from liquid flow in the branch 65 of the inlet water described above. When the inlet water flows, the drain valve 57 is in the down position as shown in FIG. 14 and the valve stem 69 is in down position providing a passageway from the inlet 68 of the metering cup through opening 4, by valve 69a and into passage 70 from which it is lead through passage 70c to the distributor 55 and on to the top of the mineral tank.

METERING CUP OR CHAMBER

Figure 12:
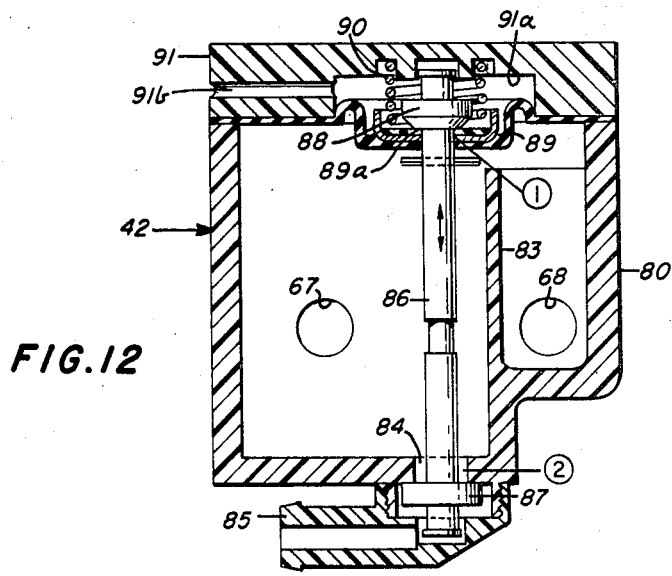
FIG. 12 is a sectional view of the fluid metering cup or chamber.

In FIG. 11 the metering cup or chamber 42 is shown detached from the valve body or head assembly. A cross section of the metering cup or chamber is shown in FIG. 12. The metering cup has a cup portion or housing 80 with horizontally extending mounting ears 81—81 that are received within slots 82 in the middle sections 52 where they are secured when the sections and gaskets are bolted together. The cup has a partition 83 which extends upward in spaced relationship to the top of the cup diaphragm operator 89 to be described. This provides two wells in the cup, one connected with the inlet 67 and one connected with the outlet 68 yet there is provided flow from one well to the other. At the bottom of the cup there is a drain opening 84 leading to an attached drain fitting 85 to which the metering cup drain conduit 43 is attached. This drain opening 84 corresponds to the previously referred to opening 2. A valve stem 86 extends from a valve portion 87 on the bottom thereof which cooperates with a seat at the base of the cup at the opening 84 to form a valve. This stem 86 extends up through the cup interior and has a vent valve portion 88 adjacent the top portion. A combined pressure output operator diaphragm and gasket 89 has a reinforced portion with a valve seat 89A therein which cooperates with the valve portion 88 to form the vent valve which previously has been described in the outline in the forepart of this specification as opening 1. A spring 90 urges the pressure operator portion downward against a cross pin on rod 86 to move the valve stem 86 downward. A cup top 91 is provided with an aperture 91a for housing the spring 90 and to provide space for movement upward of the pressure operator portion. There is a vent passage 91b extending from the vent valve portion to the atmosphere. On filling of the cup 80 the pressure operator diaphragm is moved upward and it in turn moves the valve stem 86 upward to cloes off the drain valve at the bottom and the vent valve at the top. Each time the pressure is relieved from the cup, the cup drains down through the drain opening 2 and 84.

In FIGS. 14 and 14A, there is shown a valve stem 100 for the brine-slow rinse valve, and it has a bottom valve portion 101 thereon which seats against a seat 102 in the lower face of the middle section 82 where there is located the opening 9. The valve stem 100 is guided by passage 54b in the bottom section 54 while the top of the stem 100 is guided by the recess 50c in the top section 50. A spring 103 presses against the pressure operator diaphragm 105 to urge the valve stem upward as shown in FIG. 14A. The opening at 9 communicates with a brine-slow rinse passage 104 which is formed by cooperating recesses in the bottom of middle section 52 at the top face of bottom section 54. There is a passage 104a about the stem 100 in communication with passage 104 that communicates with the space 104b below the pressure operator which is in turn in communication with passage 104c leading to the transfer passage 62 above the drain valve. The pressure operator 105 for the stem 100 is pressurized from a chamber 106 thereabove and this chamber 106 connects by passage 106a in the top 50 over to a vertical passage 106b in the gasket 51 extending downward through the middle section 52, through an aperture in the gasket 53 and into the bottom section 54 where it terminates in the regeneration inlet 106c. The passage 106a', see FIG. 14A, connects with the passage 106a to supply inlet water pressure to a brine suction jet 107 located in the middle section 52, see FIGS. 11, 14A and 17. This suction jet 107 communicates with a brine inlet fitting and passage 108, see FIG. 6, to which the brine suction conduit is attached in each brine tank.

The top of the stand pipe 56 extends into the middle section 52, see FIGS. 11 and 13, and communicates through a passage 110a to an annular recess passage 110 in the middle section. Within the annular passage 110 and concentric therein is a boss 113 within which is a vertical passage 112 leading to the tub. In the top of the boss 113 is a valve seat 111 which is at the previously describing opening 5. The bottom of the passage 112 for the conditioned water communicates with a passage 112a that leads to the tub outlet 112b. In the form here discussed there is a restrictive orifice in the tub discharge fitting 112b. Leading from the conditioned water passage 112b in the bottom section 54, see FIG. 11, is a passage 112c to below a pressure operator 123 at opening 8 to be described. In the combined diaphragm and pressure operator 51 above the seat 111 is a diaphragm closure portion 114 which is pressure operated by regeneration water pressure connected to the regeneration water pressure inlet 106a by a passage within the top section 50. Thus the regeneration water pressure entering at 106c pressurizes the operator 105 to move the valve stem 100 downward so there is an opening at 9 to the passage 104 which in turn leads through passages 104a, 104b, 104c to the transfer passage 62. At the same time the regeneration water inlet pressure passes through 106a also to pressurize the pressure operator 114 to close opening 5 at the tub discharge supply and also feeds the suction jet 107 through the passage 106a'.

In FIGS. 11 and 14 there is in the middle section 52 a transfer well 120 which is closed by part of the diaphragm 51 thereabove and has a flow control member 121 therein held by a bushing 121a thereabove. A seat 122 is at the bottom of the well 120 at opening 8 to form a foot valve. A pressure operator portion 123 in the combined pressure operator and diaphragm 53 seats against the seat 122. A passage 124 leads from the bottom of the foot valve just above the pressure operator 122 to the transfer well 62. A further passage 112c in the bottom section 54, see FIG. 11, leads from the bottom of the transfer well 120 to the conditioned water outlet 112a so as to pressurize the bottom of the diaphragm 123 to close off opening 8. In a modified form of this construction shown in FIG. 14A, to be described, this foot valve is replaced by a spring pressed normally closed valve.

Figure 9:
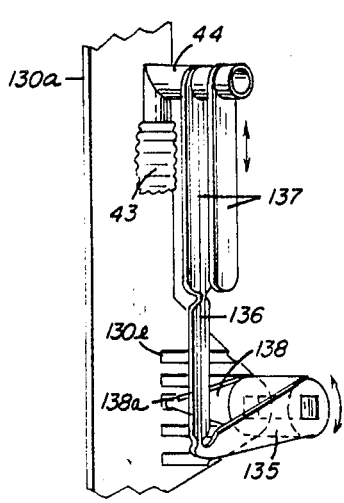
FIG. 9 is a fragmentary perspective view of the brine make-up water control.
Figure 10:
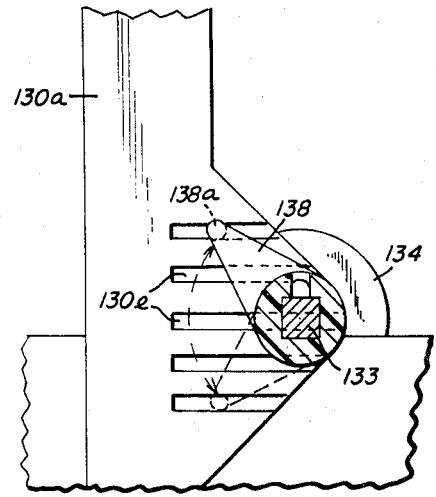
FIG. 10 is a sectional view of the control of the brine make-up water taken on line 10—10 of FIG. 8.
Figure 8:
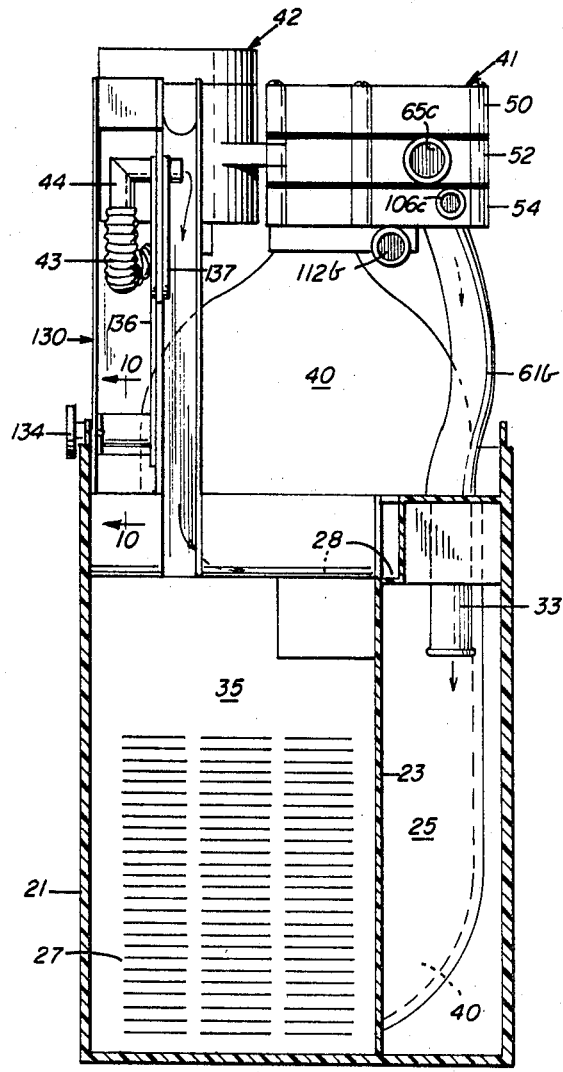
FIG. 8 is a sectional view taken on line 8—8 of FIG. 6.

In FIGS. 5, 6, 9 and 10 there is shown the adjustable mounting previously indicated at 45 for the brine make-up water outlet from the metering cup for holding the discharge elbow 44 thereof. There is a molded assembly tower generally indicated at 130 and it is formed with front member 130a and intermediate member 130b and a back member 130c attached to an end plate 130d. Slot 131 is in the end portion 130d and the conduit 43 is lead therethrough to elbow 44 which is supported in a slot 132 in the middle member 130b. A pivot shaft 133, see FIGS. 9 and 10, extends horizontally through the member 130a to the front and has a control knob 134 thereon at the front of the water conditioner housing. A crank arm 135 connects to the pivot shaft and has a link 136 attached to the end thereof which has its other end attached to elbow 44. The crank arm 135 and link 136 in the form shown are a molded plastic having flexible hinged joints between the arm 135 and the link 136. A strip 137 depends from the elbow 44 and is spaced from the link 136 and is received over the lower portion of the middle member 130b of the tower. As the knob 134 is rotated the discharge end of the conduit 45 at the elbow 44 is adjusted so as to position the level to which the metering cup will drain down to each time of pulsing of water passing therethrough. An indexing mechanism for adjusting the height of the discharge elbow 44 is shown in FIGS. 9 and 10. The pivot shaft 133 has another crank arm 138 thereon with a bottom 138a or detent extending transversely on the end thereof and cooperating with spaced apart horizontal slots 130e in the tower member 130a.

MODIFIED VALVE FOR TRANSFER WELL

In FIG. 14A there is shown a modified form of valve for the transfer well 121. A valve stem 140 has a valve portion 141 on the bottom end thereof which seats upon a seat 142 in the bottom face of the middle section 50 to form the foot valve. The pressure operator 143 attached to the stem 140 is formed as a part of the gasket 51 and is spring pressed upward by a spring 143 in the well 121. The corresponding passage 124a to passage 124 leads from the bottom foot valve of the transfer well 121 in FIG. 14A to the transfer passage 62. This puts a positive pressure closing the opening 8 as discussed for FIG. 14 and thus the tub outlet opening restrictor may be removed. A modified form of metering cup is utilized so that its vent to drain valve is closed by pressure in advance of filling of the cup.

MODIFIED METERING CUP OR CHAMBER

The modified metering cup or chamber is shown in FIGS. 19–24. The purpose of this cup is to provide a restrictor valve in the inlet thereof so that water pressure may be applied to the operating diaphragm of the valve therein to close the drain valve in advance of filling the cup. This is useful where the operating pressures are relatively low such as the order of two or three pounds pressure per square inch. This insures that the metering cup drain is closed and that the cup will fill up and pass water on to the rest of the system. This permits the opening up of the service flow passages so that restrictions are removed therein such as the previously described restrictor opening in the discharge of the conditioned water to tub for the outlet of the water conditioner. In this modified form of cup, the diaphragm closure at opening 5 previously described can now be lightened up so that in service operation it has no restriction or very little restriction to the discharge of the refined water at that point. This modified form of cup will now be described.

The modified cup or chamber generally indicated at 150 has a cup housing 151 with horizontally extending mounting ears 150a. There is a bottom drain opening and valve seat 152. A partition 153 separates the inlet portion of the cup from the outlet portion of the cup. In FIG. 20 the inlet portion of the cup would be in the well to the left of partition 153 while the outlet portion would be to the right of this partition 153 where the restrictor valve 165 discharges. At the top of the cup there is a closure member 154 which seats on a gasket 155. In the closure member 154 is an aperture 154a for a valve stem 156. Also in the top closure member 154 is a float cage 154b for a vent valve. In FIG. 23 there are channel arrangement 154c for leading operating pressure water to the diaphragm for the valve 156 to be described.

The valve stem 156 extends up through the cup where it is attached at its upper end to a combined gasket and pressure operator portion 157. Over the pressure operator 157 is a top 158 having a pressure operator recess 158a therein. A vent opening 158b extends upward from the recess 158a. A vent opening 158c extends also within the top to a vent operated float chamber 154b formed in the closure member 154. A valve seat 157a is formed in the gasket 157 exterior of the pressure operator portion and a float 162 housed in the cage 154b seats and closes off the vent opening 157a to the atmosphere to the opening 158c through the top 158 when the cup is pressurized from within.

A spring 159 seats within the recess 158a at the top and urges the pressure operator 157 in a downward direction to maintain the drain valve open unless the pressure operator 159 is pressurized from below.

At the bottom of the cup is a removable plug 160 having a guideway therein for the valve stem. A drain outlet 161 joins with the bottom drain.

An inlet to the cup is indicated at 163 and from this there extends a vertical passage 163a upstream of a pressure restrictor valve 165 housed in the inlet 163. The pressure restrictor valve 165 operates against a spring 165a. Thus water pressure entering the inlet 163 is diverted first up through the vertical passage 163a through an opening 155a in the gasket 155, through an opening 154d in the closure member 154 to the bottom of the pressure operator 157 so as to apply pressure thereto and lift the valve stem 157 upward and seat its valve 156a on the bottom thereof against the valve seat opening 152 in the bottom of the cup. The water pressure entering the aperture 154b in the closure member passes, see FIG. 23, to a channelways 154c so that it moves horizontally over the top of the closure member 154 and below the pressure operator 157 so that it may act thereon.

It is not necessary for springs to be used in these various valve members of this multiple valve system, however, for safety purposes, positive biasing is provided to the various spring members for various valves.

While the metering cup or chamber has been shown in the inlet water supply, it could be arranged in the regeneration water supply and the timer could be pulsed so that measured amounts of make-up brine water was provided for the brine tank during the regeneration cycle of bringing and slow rinsing.

The various flows through the system will be described for the various cycles.

SERVICE FLOW

The flow path during the conditioning of the water is through the mixer valve generally indicated at 13 to the inlet water fitting 65c. The inlet water branches two ways at 65c, one branch goes to move the pressure operator 63 down so as to close opening 7 and this same branch pushes pressure operator 71 down so that opening 4 is open. The other branch of inlet water passes through passage 66 to the metering cup which becomes pressurized and its drain valve at opening 2 closes. The water passes through the metering cup, out its outlet 68, through passage 70a, opening 4, passage 70 and passage 70c to the top of the mineral tank 40. The water passes down through the mineral bed where it is conditioned, up the stand pipe 56, out opening 5, through opening 112, passageway 112a, and out fitting 112b to the tub as conditioned water. A passage 112c leading from passageway 112a pressurizes the diaphragm 123 to close opening 8 closed in one form. In the form shown in FIG. 14A, opening 8 is closed by a spring pressed valve 141. The pressure goes off of the metering cup on each interruption of the inlet water flow there-through and it drains to the brine tank to provide make-up brine water.

BRINE-SLOW RINSE FLOW

The flow is from the regeneration solenoid operated valve generally designated 15 to the regeneration water inlet fitting 106c. The regeneration water passes up the passageway 106b, closes the vent valve 73, passes over the diaphragm portion of top combined gasket 51 above the transfer well 120 through passage 106a to pressure chamber 106, pushes pressure operator 105 down causing opening 9 to be opened, passes on through the top section 50 passageway 106a' to above brine suction jet 107, withdraws brine from brine tank and discharges through opening 9 to the brine-slow rinse passage 104, flows upward through passage 104a, passage 104c to transfer passage 62. The opening 6 in the bottom of the transfer passage 62 is closed. The brine and slow rinse carrier water pass from transfer passage 62, through passage 124, through opening 8 at the bottom of transfer well 120, up through well 120, through passage 125 in the middle section 52 to the annular space 110, passage 110a to the top of the stand pipe 56, down through the stand pipe 56, up through the mineral bed, out passage 70, through 70b connected with passage 70 to below opening 7, through opening 7 to the drain passage 61 and on to drain. After the brine has been drawn from the brine tank, the opening 11 closes in the brine tank and the flow of regeneration water continues as a slow rinse flow.

FAST RINSE FLOW

The brine-slow rinse continues from the prior cycle with only the slow rinse flowing. However, the inlet water pressurizes the drain valve to open opening 6 so that the slow rinse water passes from the transfer passage 67 to the drain passage and does not go to the mineral tank as before. The inlet water passes as in the service cycle through branch one to pressurize the drain valve, the pressure operator 71 to open opening 4 and pressurizes pressure operator 114 to close opening 5 to the tub. The inlet water from the second branch passes through the metering cup to the passage 70 and to the top of the brine tank. It passes down through the brine tank as a fast rinse, up through the stand pipe to annular passage 110, through passage 125 to the transfer well 120, down through the transfer well through its foot valve, through opening 8, passageway 124 to the transfer passage 62 and down through opening 6 to the drain passage 61 and on to the drain. On completion of the fast rinse cycle, the metering cup again drains to the brine tank as make-up brine water.

What is claimed is:

1. A water conditioner comprising a tank for a mineral bed, a brine and salt chamber, a head assembly on and communicating with the tank and a stand pipe extending from the head assembly into the tank to below the mineral bed, said head assembly having a stand pipe communicating passage adjacent the top of the stand pipe, a tank communicating passage leading to the top of the tank, a first inlet for water to be conditioned having first and second branch passageways; a brine make-up water metering chamber having a water inlet and outlet, said inlet being connected with said second branch inlet, a bottom drain and valve means connected with a pressure operator in the top of said chamber operated by pressure in the chamber and a vent valve means; a tank communication passage valve means positioned between the tank communication passage and the outlet of the metering chamber and having a pressure operator, an outlet for conditioned water adjacent the stand pipe communicating passage at the top of the stand pipe, a conditioned water valve between said last named passages and having a pressure operator, a drain passage, an upper transfer passage thereabove, a lower transfer passage therebelow, a fluid pressure operated drain valve means leading to the drain passage and having lower and upper valve portions for closing off and opening respective communication between said transfer passages to said drain passage; passageway means leading from said first inlet water branch to said fluid pressure operated drain valve to operate said drain valve to close off said lower transfer passage, and said first inlet water branch leading onto said pressure operator for the tank communication valve means to open same; a brine and slow rinse water chamber, a passage leading from said last mentioned chamber to said upper transfer passage, a brine and slow rinse valve between said brine and slow rinse water chamber and the passage leading therefrom and having a fluid pressure operator, a brine suction jet means leading to said brine and slow rinse chamber, a brine conduit connecting said brine and salt chamber and said brine suction jet means; a regenerator water pressure inlet connected with a passageway leading to above a diaphragm means over a transfer well, to said pressure operator for the brine and slow rinse valve, to said jet and to said pressure operator for the conditioned water valve; a passageway connecting the upper transfer passage and the bottom of said transfer well, a foot valve means for the bottom of said transfer well to close off said passageway connected with the bottom, a passageway in the transfer well above said foot valve leading to said stand pipe communicating passage, a passageway leading from said tank communication passage to the lower passage below said drain passage; means for periodically supplying water to said head assembly at the first inlet and to said regenerator water pressure inlet selectively for service cycle of conditioning the water when supplied only to said first inlet, said metering chamber filling and passing water therethrough to said mineral tank and to the conditioned water outlet, said metering chamber venting and draining to said salt and brine chamber through the drain valve on each interruption of inlet water, said regeneration water when supplied providing a brining of said mineral tank followed by slow rinse and thereafter supplying water to both said first inlet and said regeneration inlet to provide a fast rinse for said mineral tank.

2. A water conditioner according to claim 1 wherein said outlet for conditioned water has a pressure restrictor therein and a passage from said outlet upstream of the restrictor leading to below said foot valve in the transfer well to pressure the same closed.

3. A water conditioner according to claim 1 wherein said diaphragm means over the transfer well has a valve stem depending therefrom and extending through said well through the bottom opening thereof where it is attached to said foot valve and biasing means holding said foot valve up and closed.

4. A water conditioner according to claim 1 wherein said transfer well has a fluid flow restrictor therein.

5. A water conditioner according to claim 1 wherein said brine and salt chamber has an air check valve at said brine suction conduit therein.

6. A water conditioner according to claim 1 wherein said regeneration water pressure inlet has a vacuum breaker means therein adjacent its entrance to said head assembly.

7. A water conditioner according to claim 1 wherein said drain passage has a conduit leading to a drain line having a vacuum breaker means therein.

8. A water conditioner according to claim 1 wherein said metering chamber has a partition therein between said inlet and outlet and extending upward in spaced relation to the top of the chamber thereby forming two communicating wells in the chamber.

9. A water conditioner according to claim 1 wherein said outlet for conditioned water has a pressure restrictor therein and a passage from said outlet up stream of the restrictor leading to below said foot valve in the transfer well to pressure the same closed, said transfer well has a fluid flow restrictor therein, said brine and salt chamber has an air check valve at said brine suction conduit therein, said regeneration water pressure inlet has a vacuum breaker means therein adjacent its entrance to said head assembly and said drain passage has a conduit leading to a drain line having a vacuum breaker means therein.

10. A water conditioner according to claim 1 wherein said tank communicating passage valve means and said brine and slow rinse valve have stems and a valve portion for closing a seat thereabove and said stems are connected with diaphragm pressure operators and having biasing means urging them closed, wherein said drain valve has a valve stem with said lower and upper valve portions therein and said stem extends up through the upper transfer passage in spaced relation thereto, said fluid pressure operator of the drain valve is a diaphragm attached to said stem and there are biasing means urging the upper portion on a seat in the upper transfer passage and wherein said conditioned water valve is a pressure operated diaphragm seating on a seat between said stand pipe communicating passage and said outlet for conditioned water adjacent thereto.

11. A water conditioner according to claim 1 wherein the metering chamber drain valve has a stem extending upward therefrom through the chamber where it connects with said pressure operator, said pressure operator being a diaphragm through which the stem extends and a vent valve on the top of said stem seating on a seat surrounding said stem and an air passage above the diaphragm leading to the atmosphere, said drain valve closing on upward movement against a seat in the bottom drain passage of said chamber.

12. A water conditioner according to claim 1 wherein the top of said pressure operator and having an aperture therethrough for said connector between the drain valve in the chamber and the pressure operator, a restrictor release valve set to operate on reaching a certain water pressure located in said water inlet, a passage connected with said inlet upstream of said restrictor and leading through said closure member to discharge below said pressure operator whereby the inlet water first passes to below said pressure operator to actuate same to close said drain valve in the metering chamber following which on build up of pressure said inlet water passes on through the inlet unseating the restrictor valve to the metering chamber and a vent valve means extending from within the metering chamber through said closure member to vent outside said metering chamber.

13. In a water conditioner, a housing having a container, a mineral tank having a multiple valve head assembly on the top thereof nested in one end of said housing adjacent one end of said container, said head assembly having a brine make-up water metering cup having a drain at its bottom portion and means for carrying out water flow through the mineral bed for conditioning water and mineral bed, said container having a salt storage portion at the other end, a spillway passage in the upper portion thereof for bring make-up water and having a discharge to the salt storage portion adjacent one end of the container, a conduit means leading from the drain of the metering cup to a support on said container above said spillway passage so as to empty therein, a partition having perforations in its lower portion received in said container adjacent its middle portion to separate the salt storage end from the other end of the container, said partition being perforated to permit water to flow from the salt storage end to the other end of the container as brine, said partition extending upward in spaced relation to the top of the container and forming a barrier over which possible overflow brine may flow back to the salt storage portion, said partition being positioned so that its lower end provides a wider storage for salt at its lower portion than at the salt storage upper portion to provide free down flow of the salt, a drain pocket in said container to receive drain effluent from said valve head assembly having a vent to the atmosphere and an outlet in its lower portion for attachment of a further drain conduit and channelways in the rear portion for housing water supply and conditioned water conduits leading to said multiple valve head assembly.

14. In a water conditioner according to claim 13 wherein said container has in the end opposite said salt storage end a brine suction fitting to which a brine suction conduit extends from said multiple valve head and an air vent check valve to close said suction fitting after withdrawal of the brine.

15. In a water conditioner according to claim 13 wherein said container in the salt storage portion thereof has a window therein adjacent the bottom of the container to observe the presence or absence of salt in the container.

16. In a water conditioner according to claim 13 wherein said support for the conduit means leading from the metering cup is adjustable on said container for holding and positioning the discharge end of said conduit means with respect to the liquid level to be drained down to in said cup each time said cup is depressurized thereby providing additional metering of liquids.

17. In a water conditioner according to claim 16 wherein said drain conduit holding and positioning means comprises a vertically disposed guide means for the discharge end, a pivotal mounting having a shaft pivoted therein, a crank arm fixed to said shaft and a connecting link connecting said crank arm and an indexing means attached to said shaft for holding the shaft in a selected rotated position.

18. A liquid handling multiple valve head assembly comprising a body having a stand pipe passage connectable with the top of a stand pipe, a tank communicating passage leading to a tank connection means, a first inlet for liquid to be treated having first and second branch passageways; a liquid metering chamber having an inlet and outlet, said inlet being connected with said second branch inlet, a bottom drain and valve connected with a pressure operator in the top of chamber operated by pressure in said chamber; a tank communicating passage valve means positioned between the tank communication passage and the outlet of the metering chamber and having a pressure operator, an outlet for treated liquid adjacent the stand pipe communicating passage, a treated liquid valve between said last named passages and having a pressure operator, a drain passage, an upper transfer passage thereabove, a lower transfer passage therebelow, a fluid pressure operated drain valve means leading to the drain passage and having lower and upper valve means portions for closing off and opening respective communication between said transfer passages to said drain passage; passageway means leading from said first inlet water branch to said fluid pressure operated drain valve to operate said drain valve to close off said lower transfer passage, and said first inlet water branch leading onto said pressure operator for the tank communication valve means to open same; a second liquid and rinse water chamber, a passage leading from said last mentioned chamber to said upper transfer passage, a second liquid and slow rinse valve between said second liquid and slow rinse water chamber and the passage leading therefrom and having a fluid pressure operator, a second liquid suction jet having conduit means adapted to draw from a second liquid supply; a regenerator liquid pressure inlet for rinse water connected with a passageway leading to above a diaphragm means over a transfer well, to said pressure operator for the second liquid and slow rinse valve, to said jet and to said pressure operator for the treated liquid valve; a passageway connecting the upper transfer passage and the bottom of said transfer well, a foot valve means for the lower end of said transfer well to close off said passageway connected with the bottom, a passageway in the transfer well above said foot valve leading to said stand pipe communicating passage and a passageway leading from said tank communication passage to the lower passage below said drain passage.

19. A liquid handling multiple valve head assembly according to claim 18 wherein said outlet for treated liquid has a pressure restrictor therein and a passage from said outlet upstream of the restrictor leading to below said foot valve in the transfer well to pressure the same closed.

20. A liquid handling multiple valve head assembly according to claim 18 wherein said diaphragm means over the transfer well has a valve stem depending therefrom and extending through said well through the bottom opening thereof where it is attached to said foot valve and biasing means holding said foot valve up and closed.

21. A liquid handling multiple valve head assembly according to claim 18 wherein said transfer well has a fluid flow restrictor therein.

22. A liquid handling multiple valve head assembly according to claim 18 wherein said metering chamber has a partition therein between said inlet and outlet and extending upward in spaced relation to the top of the chamber thereby forming two communicating wells in the chamber.

23. A liquid handling multiple valve head assembly according to claim 18 wherein said tank communicating passage valve means and said second liquid and slow rinse valve have valve stems and valve portion for closing a seat thereabove and said stems are connected with diaphragm pressure operators and having biasing means urging them closed, wherein said drain valve has a valve stem with said lower and upper valve portions thereon and said stem extends up through the upper transfer passage in spaced relation thereto, said fluid pressure operator of the drain valve is a diaphragm attached to said stem and there are biasing means urging the upper portion on a seat in the upper transfer passage, and wherein said treated fluid valve is a pressure operated diaphragm seating on a seat between said stand pipe communicating passage and said outlet for treated water adjacent thereto.

24. A liquid handling multiple valve head assembly according to claim 18 wherein the metering chamber drain valve has a stem extending upward therefrom through the chamber where it connects with said pressure operator, said pressure operator being a diaphragm through which the stem extends and a vent valve on the top of said stem seating on a seat surrounding said stem and an air passage above the diaphragm leading to the atmosphere, said drain valve closing on upward movement against a seat in the bottom drain passage of said chamber.

25. A liquid handling multiple valve head assembly according to claim 18 wherein said metering chamber has a closure member over the top of said pressure operator and having an aperture therethrough for said connector between the drain valve in the chamber and the pressure operator, a restrictor release valve set to operate on reaching a certain water pressure located in said water inlet, a passage connected with said inlet upstream of said restrictor and leading through said closure member to discharge below said pressure operator whereby the inlet water first passes to below said pressure operator to actuate same to close said drain valve in the metering chamber following which on build up of pressure said inlet water passes on through the inlet unseating the restrictor valve to the metering chamber and a vent valve means extending from within the metering chamber through said closure member to vent outside said metering chamber.

26. A water conditioner comprising a tank for a mineral bed, a brine and salt chamber, a head assembly on and communicating with the tank and a stand pipe extending from the head assembly into the tank to below the mineral bed, said head assembly having a stand pipe communicating passage adjacent the top of the stand pipe, a tank communicating passage leading to the top of the tank, a first inlet water means for water to be conditioned having first and second branch passageways, a passage means connecting said second branch of inlet water and said tank communication passage, a tank communication valve means positioned between said second branch passage and said tank communication passage and having a pressure operator, an outlet for conditioned water adjacent the stand pipe communication passage at the top of the stand pipe, a conditioned water valve between said last named passages and having a pressure operator, a drain passage, an upper transfer passage thereabove, a lower transfer passage therebelow, a fluid pressure operator drain valve means leading to the drain passage and having lower and upper valve portions for closing off and opening respective communication between said transfer passages to said drain passage; passageway means leading from said first inlet water branch to said fluid pressure operated drain valve to operate said drain valve to close off said lower transfer passage, and said first inlet water branch leading onto said pressure operator for the tank communication valve means to open same; a brine and slow rinse water chamber, a passage leading from said last mentioned chamber to said upper transfer passage, a brine and slow rinse water valve between said brine and slow rinse water chamber and the passage leading therefrom and having a fluid pressure operator, a brine suction jet means leading to said brine and slow rinse chamber, a brine conduit connecting said brine and salt chamber and said brine suction jet means; a regeneration water pressure inlet means connected with a passageway leading to above a diaphragm means over a transfer well, to said pressure operator for the brine and slow rinse valve, to said jet and to said pressure operator for the conditioned water valve; a passageway connecting the upper transfer passage and the bottom of said transfer well, a foot valve means for the bottom of said transfer well to close off said passageway in the transfer well above said foot valve leading to said stand pipe, a passageway leading from said tank communication passage to the lower passage below said drain passage; a brine make-up metering chamber means having a water inlet and outlet, said inlet and outlet of the metering chamber being connected in one of said inlet water supply means and regeneration water pressure means for conducting water through said metering chamber, said metering chamber having a bottom drain and valve means connected with a pressure operator in the top of said chamber operated by pressure in the chamber and a vent valve means; means for periodically supplying water to said head assembly and the first inlet water means and to said regenerator water pressure inlet means selectively for service cycle of conditioning the water when supplied only to said first inlet, said inlet water passing to and through said tank communication passage to and through the mineral tank and to the conditioned water outlet, said regeneration water when supplied providing a brining of said mineral tank followed by slow rinse, there following supplying water to both said first inlet water means and said regeneration inlet water means to provide a fast rinse for said mineral tank, said metering chamber on each interruption of the water supplied therethrough venting and draining the water therein to said salt and brine chamber through the drain valve.

References Cited

UNITED STATES PATENTS

| | | | |
|---|---|---|---|
| 2,767,139 | 10/1956 | Hagman | 210—126 |
| 3,073,674 | 1/1963 | Rudelick | 210—140 X |
| 3,342,336 | 9/1967 | Rose | 210—190 X |

REUBEN FRIEDMAN, Primary Examiner

FRANK A. SPEAR, Jr., Assistant Examiner

U.S. Cl. X.R.

137—115, 599.1; 210—126, 134, 136, 137, 140, 191, 278